United States Patent
Syrjarinne et al.

(10) Patent No.: US 7,409,188 B2
(45) Date of Patent: Aug. 5, 2008

(54) METHOD AND APPARATUS FOR LOWERING POWER USE BY A RANGING RECEIVER

(75) Inventors: Jari Syrjarinne, Tampere (FI); Jani Kappi, Tampere (FI)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 10/727,342

(22) Filed: Nov. 26, 2003

(65) Prior Publication Data

US 2005/0113124 A1    May 26, 2005

(51) Int. Cl.
    *H04B 7/185*    (2006.01)
(52) U.S. Cl. .................. 455/13.4; 455/67.11; 455/574; 342/352; 342/357.01
(58) Field of Classification Search ............. 455/404.1, 455/403, 521, 456.1, 457, 566, 564, 456.6, 455/574, 255, 502, 427, 13.4, 127.1, 127.5, 455/565; 340/539.23, 539.13; 342/357.12, 342/357.06, 357.08, 357.01
    See application file for complete search history.

(56) References Cited

U.S. PATENT DOCUMENTS

| | | | |
|---|---|---|---|
| 4,066,993 A | 1/1978 | Savit | |
| 4,535,625 A | 8/1985 | Lyle, Jr. | |
| 5,144,595 A | 9/1992 | Graham et al. | |
| 5,355,316 A | 10/1994 | Knobbe | |
| 5,381,095 A | 1/1995 | Andrews | |
| 5,506,817 A | 4/1996 | O'Brien, Jr. | |
| 5,511,042 A | 4/1996 | O'Brien, Jr. | |
| 5,525,995 A | 6/1996 | Benner | |
| 5,537,368 A | 7/1996 | O'Brien et al. | |
| 5,592,173 A | * 1/1997 | Lau et al. | ............... 342/357.12 |
| 5,650,785 A | 7/1997 | Rodal | |
| 5,752,218 A | 5/1998 | Harrison et al. | |
| 5,864,315 A | 1/1999 | Welles, II et al. | |

(Continued)

FOREIGN PATENT DOCUMENTS

EP    1 102397 A2    5/2001

OTHER PUBLICATIONS

Enhanced accuracy GPS navigation using the interacting multiple model estimator, X. Lin et al., IEEE Proceedings of the 2001 Aerospace Conference, vol. 4, p. 1911-1923, 2001.

(Continued)

*Primary Examiner*—Tan Trinh
(74) *Attorney, Agent, or Firm*—Ware, Fressola, Van Der Sluys & Adolphson LLP

(57) ABSTRACT

Equipment and a method by which power consumed by a ranging receiver (12) is reduced without appreciably impairing performance of the GPS receiver (12), the method including: a step (21) in which a controller (15) reads sensor signals provided by a motion sensor (14) mechanically coupled to the ranging receiver (12); and a step (22) in which the controller (15) powers down selected components of the ranging receiver (12) based on whether the sensor signals indicate only at most insubstantial motion of the ranging receiver (12). The motion sensor is advantageously a motion sensor constructed using MEMS technology, but at any rate is of a type using so little power as to provide a power savings when used according to the invention, i.e. when it is always on and at least partially based on its sensor signals, the ranging receiver (12) is sometimes at least partially turned off.

20 Claims, 1 Drawing Sheet

U.S. PATENT DOCUMENTS

| | | | |
|---|---|---|---|
| 5,883,594 A | 3/1999 | Lau | |
| 5,883,595 A | 3/1999 | Colley | |
| 5,902,351 A | 5/1999 | Streit et al. | |
| 5,995,042 A | 11/1999 | Durboraw, III et al. | |
| 6,028,887 A | 2/2000 | Harrison et al. | |
| 6,067,460 A * | 5/2000 | Alanara et al. | 455/574 |
| 6,127,968 A | 10/2000 | Lu | |
| 6,133,871 A | 10/2000 | Krasner | |
| 6,266,533 B1 | 7/2001 | Zadeh et al. | |
| 6,285,315 B1 | 9/2001 | Pratt | |
| 6,774,838 B2 * | 8/2004 | Sun | 342/357.06 |
| 7,015,817 B2 * | 3/2006 | Copley et al. | 340/573.4 |
| 7,130,656 B2 * | 10/2006 | Okagaki et al. | 455/557 |
| 2001/0046884 A1 * | 11/2001 | Yoshioka | 455/564 |
| 2002/0111739 A1 | 8/2002 | Jandrell | |
| 2003/0020038 A1 * | 1/2003 | Miyamoto et al. | 251/129.15 |
| 2003/0050039 A1 * | 3/2003 | Baba et al. | 455/404 |
| 2003/0107514 A1 * | 6/2003 | Syrjarinne et al. | 342/357.06 |
| 2003/0137450 A1 * | 7/2003 | Jandrell | 342/357.12 |
| 2004/0029080 A1 * | 2/2004 | Healy et al. | 434/19 |
| 2004/0041728 A1 * | 3/2004 | Bromley et al. | 342/357.12 |
| 2004/0192352 A1 * | 9/2004 | Vallstrom et al. | 455/456.6 |
| 2004/0209625 A1 * | 10/2004 | Haddrell | 455/456.1 |
| 2004/0214587 A1 * | 10/2004 | Hasebe et al. | 455/457 |
| 2005/0068169 A1 * | 3/2005 | Copley et al. | 340/539.13 |
| 2005/0104774 A1 * | 5/2005 | Pande | 342/357.12 |
| 2006/0195260 A1 * | 8/2006 | Gronemeyer | 701/213 |
| 2007/0105526 A1 * | 5/2007 | Shoobridge | 455/343.6 |

OTHER PUBLICATIONS

Using IMM adaptive estimator in GPS positioning, G. Chen et al., Proceedings of the 40th SICE Annual Conference, International Session Papers, p. 78-83, 2001.

* cited by examiner

METHOD AND APPARATUS FOR LOWERING POWER USE BY A RANGING RECEIVER

TECHNICAL FIELD

The present invention pertains to the field of ranging receivers, including GPS receivers. More particularly, the present invention pertains to saving power in such receivers.

BACKGROUND ART

For a GPS receiver integrated into a cellular phone, power-consumption is an issue. Since only a limited storage of energy is available, every module inside a cellular phone should consume as little power as possible. Besides the required cellular transmitter and receiver modules, cellular phones today often include a GPS receiver module, a Bluetooth receiver module, a WLAN module, and even a camera.

There are several ways to reduce power consumption in an electrical device; e.g. the device can be miniaturized, modules/components can be selected that consume less power, or modules in the device can be selectively shut down (partially or wholly). Shutting down a module, however, is really only viable if it is possible to maintain the same level of performance with the shut down/reduced power-on time.

Of the modules now often included in cellular phones, the GPS receiver consumes significant power. There are many generally known techniques for saving power consumed by a GPS receiver (in a cellular phone or in a standalone application): Parts of the GPS receiver hardware can be shut down; for example, any excess channels not useful in tracking satellites due to poor local constellation can be powered-down. The GPS receiver hardware can be run at a lower frequency. And the GPS receiver RF (radiofrequency) front-end can be shut down and only the tracking loops at the DSP (digital signal processing) baseband run (to enable fast reacquisition). All of these methods, however, without more, can sacrifice GPS receiver performance.

For saving power in a cellular phone generally, it is noted that U.S. Pat. No. 6,067,460 for a MOBILE STATION HAVING ENHANCED STANDBY MODE discloses using motion sensors or a GPS receiver (or other devices) to determine when a user of a cellular phone might not be moving (or moving only very slowly), in which case—usually only after the user confirms both that the user is not moving and is not likely to be moving in the next several minutes—the cellular phone stops making neighbor channel measurements for DCCH (dedicated control channel) reselection, thereby saving power.

What is still needed is a way to reduce power use by a GPS receiver—in either a standalone application or in a mobile phone—without a significant sacrifice of the GPS receiver's performance.

DISCLOSURE OF THE INVENTION

Accordingly, in a first aspect of the invention, an apparatus is provided comprising a ranging receiver, for providing output signals indicating information as to the position or motion of the ranging receiver, the apparatus characterized in that: the ranging receiver is responsive to power control signals based on sensor signals indicating whether the ranging receiver is in motion, the power control signals for powering on or off selected components of the ranging receiver; and in that the apparatus further comprises: a motion sensor, mechanically coupled to the ranging receiver, for providing the sensor signals.

In accord with the first aspect of the invention, the apparatus may also include a controller, responsive to the sensor signals, for providing the power control signals so as to power down the selected components of the ranging receiver if the sensor signals indicate that the ranging receiver is substantially stationary.

Also in accord with the first aspect of the invention, the controller may use the output signals from the ranging receiver to determine whether to power down the selected components of the ranging receiver.

Also in accord with the first aspect of the invention, the controller may re-apply power to the selected components as soon as the motion sensor indicates significant motion of the ranging receiver.

Also in accord with the first aspect of the invention, the controller may re-apply power to the selected components according to a predetermined rule allowing for the power to remain off for a predetermined time based optionally on recent past sensor signals, but at least as soon as the motion sensor indicates significant motion of the ranging receiver.

Also in accord with the first aspect of the invention, the motion sensor may be a MEMS-based motion sensor.

Also in accord with the first aspect of the invention, the motion sensor may comprise an electronic compass or an accelerometer.

In a second aspect of the invention, a system is provided including an apparatus according to the first aspect of the invention and also including one or more ranging satellites for providing ranging signals conveying navigation information, and the apparatus may provide the output signals indicating information as to the position or motion of the ranging receiver based on the ranging signals.

In a second aspect of the invention, a system is provided including a cellular communication terminal in turn including an apparatus according to the first aspect of the invention, and a cellular communication network by which the cellular communication terminal is communicative with other communication terminals.

In a third aspect of the invention, a system is provided, comprising: a cellular communication terminal including an apparatus according to the first aspect of the invention; a cellular communication network by which the cellular communication terminal is communicative with other communication terminals; and one or more ranging satellites for providing ranging signals conveying navigation information, wherein the apparatus provides the output signals indicating information as to the position or motion of the ranging receiver based on the ranging signals.

In a fourth aspect of the invention, a method is provided for saving power consumed by a ranging receiver, characterized by: a step of reading sensor signals provided by a motion sensor mechanically coupled to the ranging receiver; and a step of powering down selected components of the ranging receiver based on whether the sensor signals indicate only at most insubstantial motion of the ranging receiver.

In accord with the fourth aspect of the invention, the method may also include: a step of reapplying power to the selected components according to a predetermined rule allowing for the power to remain off for a predetermined time based optionally on recent past sensor signals, but at least as soon as the motion sensor indicates significant motion of the ranging receiver.

In a fifth aspect of the invention, a computer program product is provided comprising: a computer readable storage structure embodying computer program code thereon for execution by a computer processor, with said computer program code characterized in that it includes instructions for performing the steps of a method according to the fourth aspect of the invention.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

The invention is described here in terms of a GPS receiver, but it should be understood that the invention applies to any kind of ranging receiver, i.e. any kind of a receiver equipped to wirelessly receive information useful in determining position or velocity or another aspect of the motion or position of the receiver. For example, the invention applies also to ranging receivers used with GLONASS and receivers used with the Galileo positioning system (never abbreviated GPS—a planned satellite navigation system intended as a European alternative to the United States Global Positioning System).

The invention is based on the following observations. A GPS receiver consumes ten-twenty times more power than current motion sensors based on MEMS (Micro-electromechanical systems) technology. A GPS receiver consumes substantially more power when in active mode (i.e. actively acquiring satellite or other ranging signals and recalculating position information) than when not in active mode, i.e. is in standby (during which the GPS receiver simply holds in memory the last received ranging information and position calculations). In addition, when the user of a cellular phone is in motion, the motion includes enough accelerations to be detectable by a low-power consuming MEMS-based motion sensor.

Figure 1:
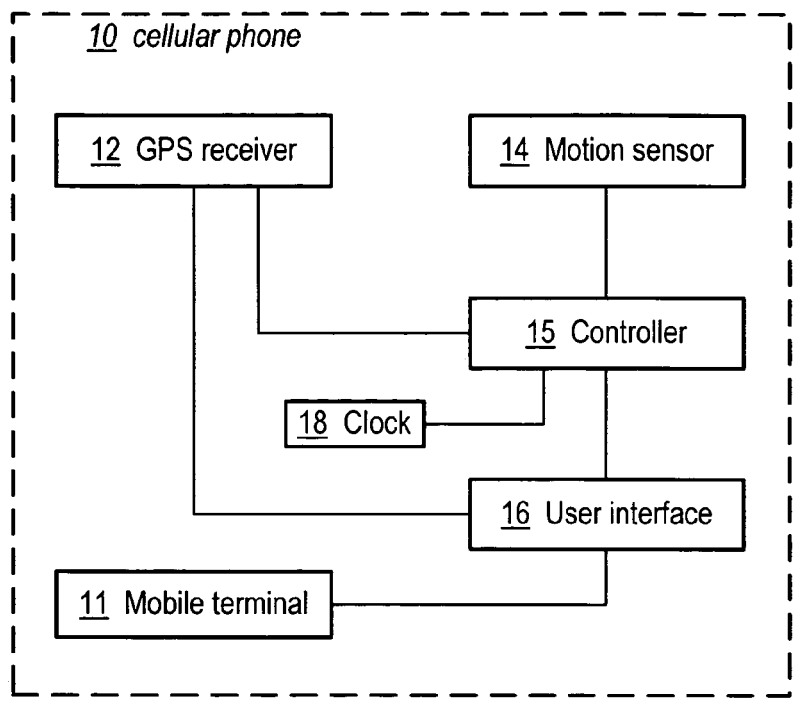
FIG. 1 is a block diagram of a cellular phone including a GPS/ranging receiver, and also including a motion sensor and a (power) controller, according to the invention.

Based on these observations, and now referring to FIG. 1, to save power in a cellular phone 10 including a mobile terminal 11 (for communicating with a cellular telecommunication network via a radio access network) and also a GPS receiver/ranging receiver 12, a motion sensor 14 is included in the cellular phone mechanically (as opposed to electromagnetically) coupled (i.e. directly or indirectly attached) to the GPS receiver 12 (so as to sense the same motion as the GPS receiver 12) and signals provided by the motion sensor 14 are used by a controller 15 for deciding whether to switch the GPS receiver 12 from active mode to standby, or to otherwise turn off one or more components of the GPS receiver 12. The controller 15 may base its decision not only on the motion sensor signals, but also on the most recent position calculations by the GPS receiver 12. In normal operation, the GPS (receiver) 12 provides its position calculations to a user interface module 16 (including typically some form of display or other means by which to convey information to a user and means by which to accept inputs from the user).

The invention thus saves power by reducing power-on time of one or more components of the GPS receiver 12, components used in receiving and processing ranging signals. And it does so in such a way as to still give a continuous periodic position result to the user because the power is turned off by the controller 15 only if inputs to the controller—from typically both the motion sensor 14 and the GPS—indicate that the mobile phone is likely stationary.

The motion sensor 12 is of course of a type that uses relatively low power so that sometimes keeping the motion sensor online and turning off some of the components of the GPS receiver and sometimes keeping the motion sensor online and also keeping the GPS receiver online is less power-costly than keeping the GPS in full active mode all the time. Preferably, the motion sensor (system) 12 uses one or more relatively low-power consuming embedded motion sensors (not shown), such as electronic compasses, accelerometers (such as e.g. gyroscope-based accelerometers and including angular accelerometers), and especially such motion sensors built using MEMS technology—i.e. MEMS-based motion sensors, which consume only about 5-10% of the power that a typical GPS receiver consumes in active mode.

According to the invention in some embodiments, the power to the tracking components of the GPS receiver 12 is shut down for a period of time (that may be interrupted if motion is sensed before the time period elapses) if both the GPS receiver and the motion sensor system 14 (one or more motion sensors) detect either stationary or very slow motion (i.e. motion of no significant consequence, such as less than several centimeters per minute).

The GPS receiver 12 can be kept in standby mode (or otherwise partially turned off) according to several different possible rules: In one rule, it is kept in standby as long as the motion sensor (system) 14 does not detect motion. In another rule, it is kept in standby for some predetermined time period but not after the motion sensor 12 again senses motion. Alternatively, the GPS receiver can be turned back on (i.e. can be turned from standby or partial power down to full active mode) after a first predetermined time even if the motion sensors do not sense motion, and then, if both the motion sensor 14 and the GPS receiver 12 indicate that the user still has not moved and is not moving, the GPS receiver 12 can be turned off again for a next, longer predetermined time, and so on, for longer and longer time periods, preferably up to some maximum, as a precaution against failure of the motion sensor 14. The procedure in which the GPS receiver 12 is turned back on after a predetermined time even if the motion sensor does not detect motion (but turned back on earlier if the motion sensor does sense motion) is likely preferable for most applications, since it is simple and prudent.

Figure 2:
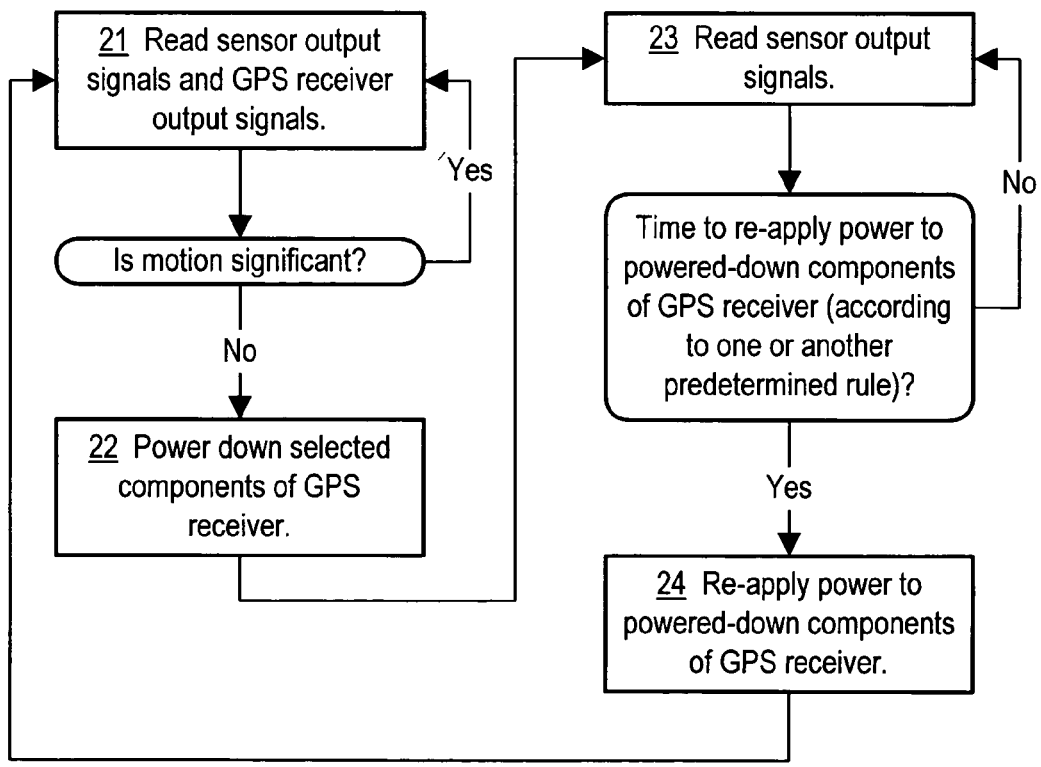
FIG. 2 is a method by which the controller is operative.

Thus, referring now to FIG. 2, the invention provides a method having a first step 21, in which the controller 15 reads the output signals of the motion sensor 14 and the output signals of the GPS receiver 12. The controller then decides whether there is significant motion indicated by the outputs. If not, then in a next step 22, the controller 15 powers down selected components of the GPS receiver 12, typically simply switching the GPS receiver from active mode to standby mode, although more sophisticated strategies for partially shutting down the GPS receiver are also contemplated by the invention. Then (after some predetermined time) in a next step 23, the controller 15 again reads output signals from the motion sensor 14 (but not also from the GPS receiver, which is turned off at this point). This step may be repeated several times in succession. Eventually, after either some predetermined time has elapsed according to e.g. a local clock 18, or as soon as the motion sensor 14 indicates significant motion, the controller 15 decides whether it is time to re-apply power to the powered-down components of GPS receiver according to one or another of the above-described (or comparable) rules, or some combination of the above (or comparable) rules. If so, the in a next step 24, the controller 15 re-applies power to the powered-down components of GPS receiver 12.

In a typical application of the invention in case of a GPS receiver included in a cellular phone 10, the GPS receiver 12 is embedded in the cellular phone so as to be either integrated into the chip set used by the phone or as a separate chip set, and, in addition, the motion sensor (system), typically consisting of one or more individual motion sensors, are integrated into the cellular phone on its printed wiring board (PWB) (also known as a printed circuit board), e.g. for gaming, UI control or other purposes.

As is clear from the above description, the invention is also of use in case of a GPS receiver not included as part of a cellular phone. In such an application, the GPS receiver equipment proper (i.e. the core equipment of the GPS receiver, such as it would be without the invention) is included in a housing that also includes one or more motion sensors and a controller, just as in the above description. And the controller is operative just as in the above description. Furthermore, using MEMS-based motion sensor technology or any other miniature motion sensor equipment, many already-manufactured GPS receivers can be retrofit with a controller and a motion sensor (system) so as to be operative according to the invention.

As another example of the use of the invention, it can be used with a so-called BlueTooth GPS module and especially such a module included in a cellular telephone, i.e. such a BlueTooth GPS module can be coupled to a motion sensor so as to be powered on and off as described above.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code—i.e. the software or firmware—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
 a ranging receiver, responsive to power control signals based on sensor signals indicating whether the ranging receiver is in motion, the power control signals for powering off selected components of the ranging receiver so as to put the ranging receiver in a standby mode as opposed to a fully active mode or a fully powered off mode, or powering on the selected components of the ranging receiver so as to put the ranging receiver in a fully active mode; and
 a motion sensor, mechanically coupled to the ranging receiver so as to move when the ranging receiver moves, configured to provide the sensor signals,
wherein the selected components of the ranging receiver is powered off if the sensor signals indicate the ranging receiver is stationary, and wherein the selected components of the ranging receiver is powered on if the sensor signals indicate the ranging receiver is in motion, or if a time since the powering off of the selected components of the ranging receiver has exceeded a predetermined time.

2. An apparatus as in claim 1, further comprising a controller, responsive to the sensor signals, configured to provide the power control signals to power on or power off the selected components of the ranging receiver if the sensor signals indicate that the ranging receiver is in motion or is substantially stationary.

3. An apparatus as in claim 2, wherein the controller is configured to also use output signals from the ranging receiver in deciding whether to power off the selected components of the ranging receiver by determining whether the output signals from the ranging receiver also indicate that the ranging receiver is substantially stationary.

4. An apparatus as in claim 1, wherein the predetermined time comprises a plurality of time limits increasing in length up to a maximum, and the increasing time limits are applied for each power on-power off cycle if the sensor signals indicate the ranging receiver is not in motion.

5. An apparatus as in claim 1, wherein the controller is configured to re-apply power to the selected components as soon as the motion sensor indicates a significant motion of the ranging receiver, but not to reapply power until the end of the predetermined time if the sensor signals indicating motion of the ranging receiver is at most several centimeters per minute.

6. An apparatus as in claim 1, wherein the motion sensor is a microelectromechanical systems (MEMS)-based motion sensor.

7. An apparatus as in claim 1, wherein the motion sensor comprises an electronic compass or an accelerometer.

8. A system, comprising:
 an apparatus as in claim 1, and further comprising
 one or more ranging satellites configure to provide ranging signals conveying navigation information,
wherein the apparatus provides the output signals indicating information as to the position or motion of the ranging receiver based on the ranging signals.

9. A system, comprising:
 a cellular communication terminal including an apparatus as in claim 1, and
 a cellular communication network by which the cellular communication terminal is communicative with other communication terminals.

10. A system, comprising:
 a cellular communication terminal including an apparatus as in claim 1;
 a cellular communication network by which the cellular communication terminal is communicative with other communication terminals; and
 one or more ranging satellites configured to provide ranging signals conveying navigation information;
 wherein the apparatus is configured to provide the output signals indicating information as to the position or motion of the ranging receiver based on the ranging signals.

11. A method, comprising:
 reading sensor signals provided by a motion sensor mechanically coupled to a ranging receiver;
 powering down selected components of the ranging receiver so as to put the ranging receiver in a standby mode as opposed to a fully active mode or a fully powered off mode if the sensor signals indicate only at most insubstantial motion of the ranging receiver, and
 reapplying power to the selected components of the ranging receiver so as to put the ranging receiver in the fully active mode if the signals provided by the motion sensor indicate a significant motion of the ranging receiver, or if a time since the powering down of the selected components of the ranging receiver has exceeded a predetermined time.

12. The method of claim 11, wherein the power is reapplied to the selected components of the ranging receiver as soon as the motion sensor indicates a significant motion of the ranging receiver, but the power is not reapplied until the end of the predetermined time if the sensor signals indicate the motion of the ranging receiver is at most several centimeters per minute.

13. A computer program product comprising a computer readable storage medium storing computer program code thereon for execution by a computer processor, said computer program code comprising instructions for performing the method of claim 11.

14. The method of claim 11, wherein in powering down selected components of the ranging receiver based on whether the sensor signals indicate only at most insubstantial motion of the ranging receiver, output signals from the ranging receiver are also used in deciding whether to power down the selected components, by determining whether the output signals from the ranging receiver also indicate that the ranging receiver is substantially stationary.

15. An apparatus, comprising:
a ranging receiver, responsive to power control signals for powering on or off selected components of the ranging receiver so as to put the ranging receiver in a standby mode as opposed to a fully active mode or a fully powered off mode, and also responsive to ranging signals from sources for positioning, configured to provide output signals indicative of the location of the ranging receiver;
motion sensor means, mechanically coupled to the ranging receiver so as to move with the ranging receiver, configured to provide sensor signals indicating whether the ranging receiver is in motion; and
controller means, responsive to the sensor signals, configured to provide the power control signals so as to power off the selected components of the ranging receiver if the sensor signals indicate that the ranging receiver is substantially stationary, and configured to provide the power control signals for powering on the selected components of the ranging receiver if the sensor signals indicate the ranging receiver is in motion, or if a time since the powering off of the selected components of the ranging receiver has exceeded a predetermined time.

16. An apparatus, comprising:
a ranging receiver, responsive to power control signals for powering on or off selected components of the ranging receiver so as to put the ranging receiver in a standby mode as opposed to a fully active mode or a fully powered off mode, and also responsive to ranging signals from sources for positioning, configured to provide output signals indicative of the location of the ranging receiver;
a motion sensor, mechanically coupled to the ranging receiver so as to move with the ranging receiver, configured to provide sensor signals indicating whether the ranging receiver is in motion; and
a controller, responsive to the sensor signals, configured to provide the power control signals so as to power off the selected components of the ranging receiver if the sensor signals indicate that the ranging receiver is substantially stationary, and configured to provide the power control signals so as to power on the selected components of the ranging receiver if the sensor signals indicate the ranging receiver is in motion, or if a time since the powering off of the selected components of the ranging receiver has exceeded a predetermined time.

17. An apparatus as in claim 16, wherein the controller is configured to also use the output signals from the ranging receiver in deciding whether to power down the selected components of the ranging receiver by determining whether the output signals from the ranging receiver also indicate that the ranging receiver is substantially stationary.

18. An apparatus as in claim 16, wherein the controller is configured to re-apply power to the selected components as soon as the motion sensor indicates significant motion of the ranging receiver.

19. An apparatus as in claim 16, wherein the controller is configured to re-apply power to the selected components as soon as the motion sensor indicates significant motion of the ranging receiver but not to reapply power for a predetermined time in case of sensor signals indicating motion of at most several centimeters per minute.

20. A cellular phone, comprising a mobile terminal configured to communicate with a cellular telecommunication network via a radio access network, and also comprising an apparatus as in claim 16.

* * * * *